United States Patent [11] 3,552,449

[72] Inventors Thomas George Woodward
Solihull;
Eric John Wright, Sutton Coldfield; Albert Thomas Hayes, Marston Green, England
[21] Appl. No. 716,373
[22] Filed Mar. 27, 1968
[45] Patented Jan. 5, 1971
[73] Assignee Joseph Lucas (Industries) Limited
Birmingham, England
[32] Priority Mar. 28, 1967
[33] Great Britain
[31] Nos. 14062/67, 14063/67 and 14064/67

[54] MACHINE FOR SECURING AND ELECTRICALLY CONNECTING AN ELECTRICAL CABLE TO AN ELECTRICAL CONNECTOR
11 Claims, 4 Drawing Figs.
[52] U.S. Cl. .................................................. 140/1, 81/9.51; 140/113
[51] Int. Cl. ...................................................... B21f 15/00
[50] Field of Search .......................................... 140/1, 113; 81/9.51; 29/282, 33

[56] References Cited
UNITED STATES PATENTS
| | | | |
|---|---|---|---|
| 3,084,574 | 4/1963 | Folkenroth .................. | 81/9.51 |
| 3,292,462 | 12/1966 | Turecek, et al. ............... | 81/9.51 |

*Primary Examiner*—Lowell A. Larson
*Attorney*—Holman, Glascock, Downing and Seebold ABSTRACT: A machine for securing and electrically connecting an electrical cable to an electrical connector includes a gripping mechanism for gripping the cable. Means operable automatically when the cable is gripped by the gripping mechanism for stripping a length of the insulating sheath from the end of the cable, and further means operable automatically when the sheath has been stripped from the cable for crimping a connector to at least the bared core of the cable while the cable is still held by the gripping mechanism.

3,552,449

MACHINE FOR SECURING AND ELECTRICALLY CONNECTING AN ELECTRICAL CABLE TO AN ELECTRICAL CONNECTOR

This invention relates to machines for securing and electrically connecting an electrical cable to an electrical connector.

A machine according to the invention includes a gripping mechanism for gripping a cable, means operable automatically when the cable is gripped by the gripping mechanism for stripping a length of the insulating sheath from the end of the cable, and further means operable automatically when the sheath has been stripped for crimping a connector to at least the bared core of the cable while the cable is still held by the gripping mechanism.

The invention further resides in a machine for stripping an insulating sheath from an electrical cable, and in a machine for crimping an electrical connector to an electrical cable.

One example of the invention is illustrated in the accompanying drawings wherein.

Figure 1:
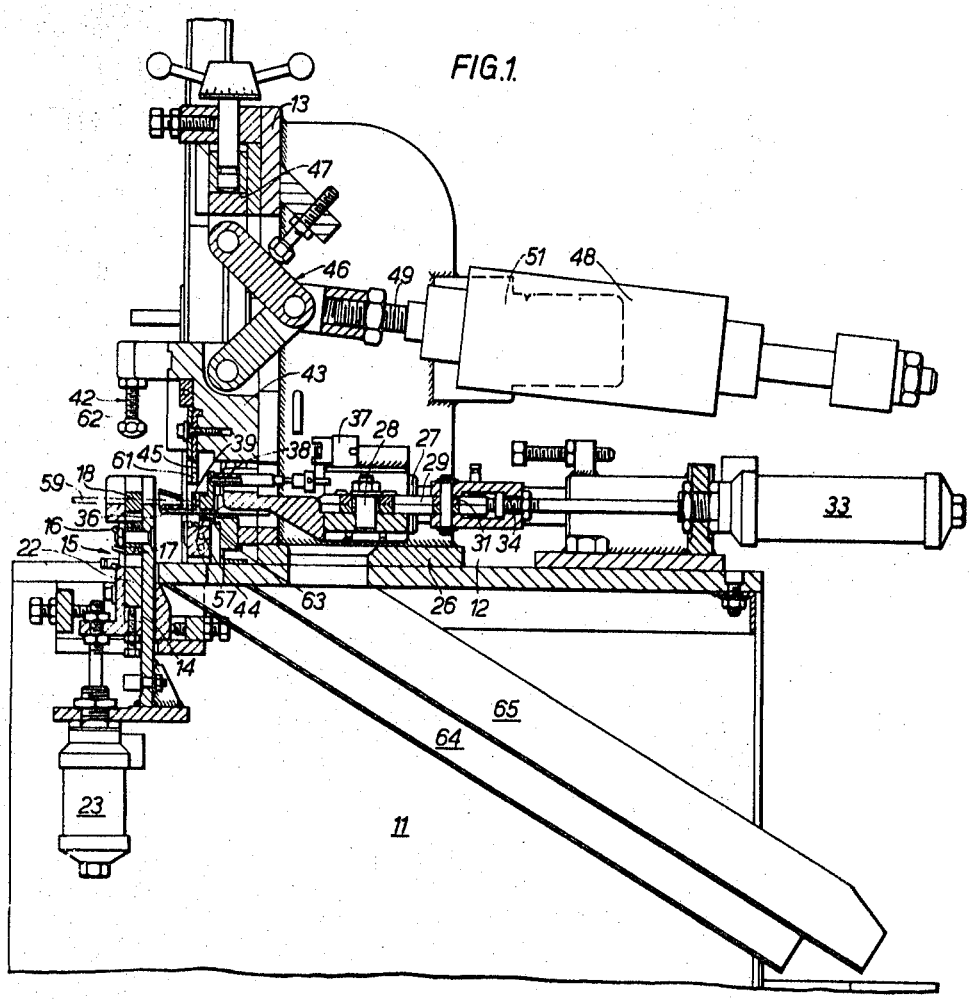
FIG. 1 is a part sectional side elevational view of a combined cable stripping and connector crimping machine.
Figure 2:
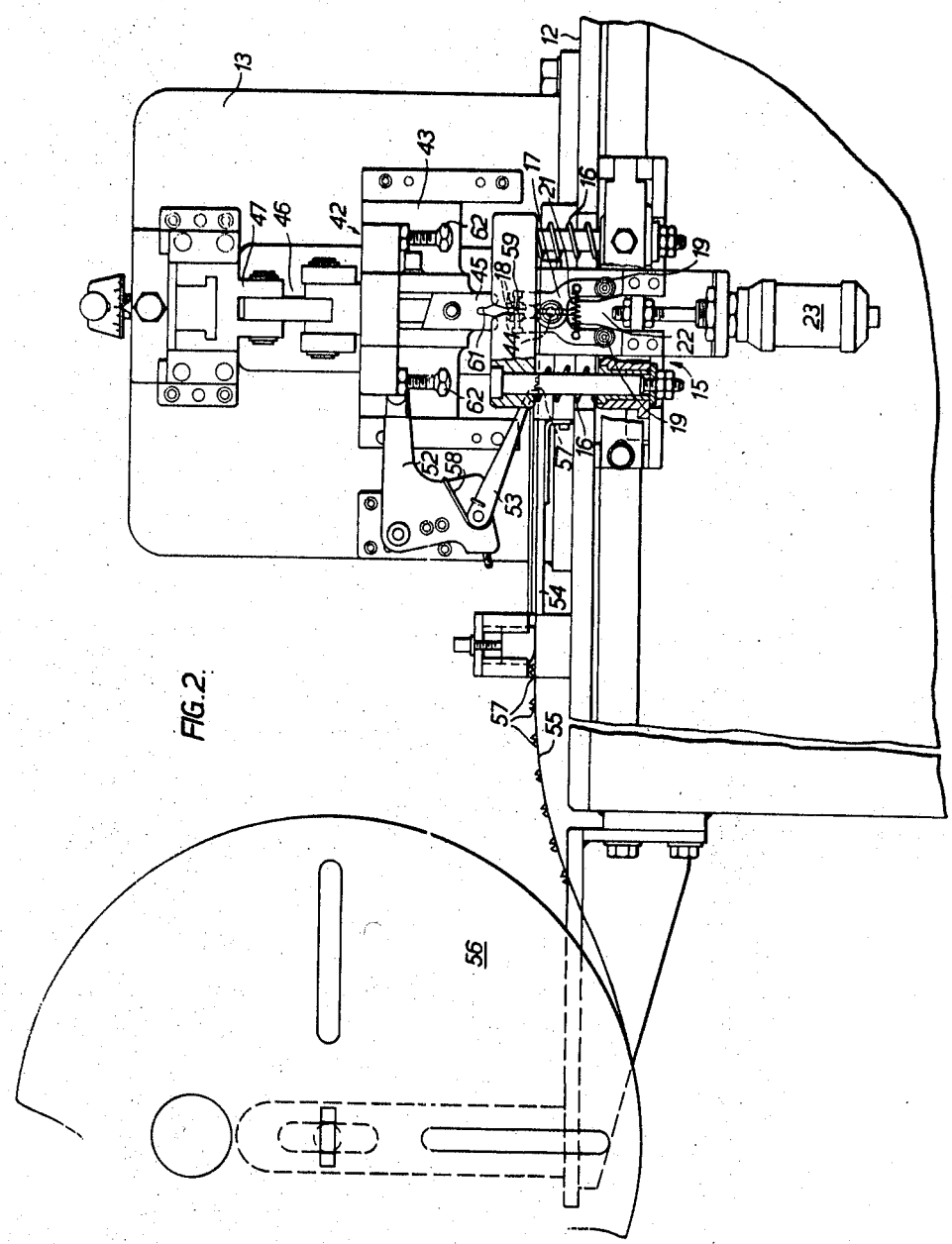
FIGS. 2 and 3 are front elevational and plan views respectively of the machine shown in FIG. 1.
Figure 3:
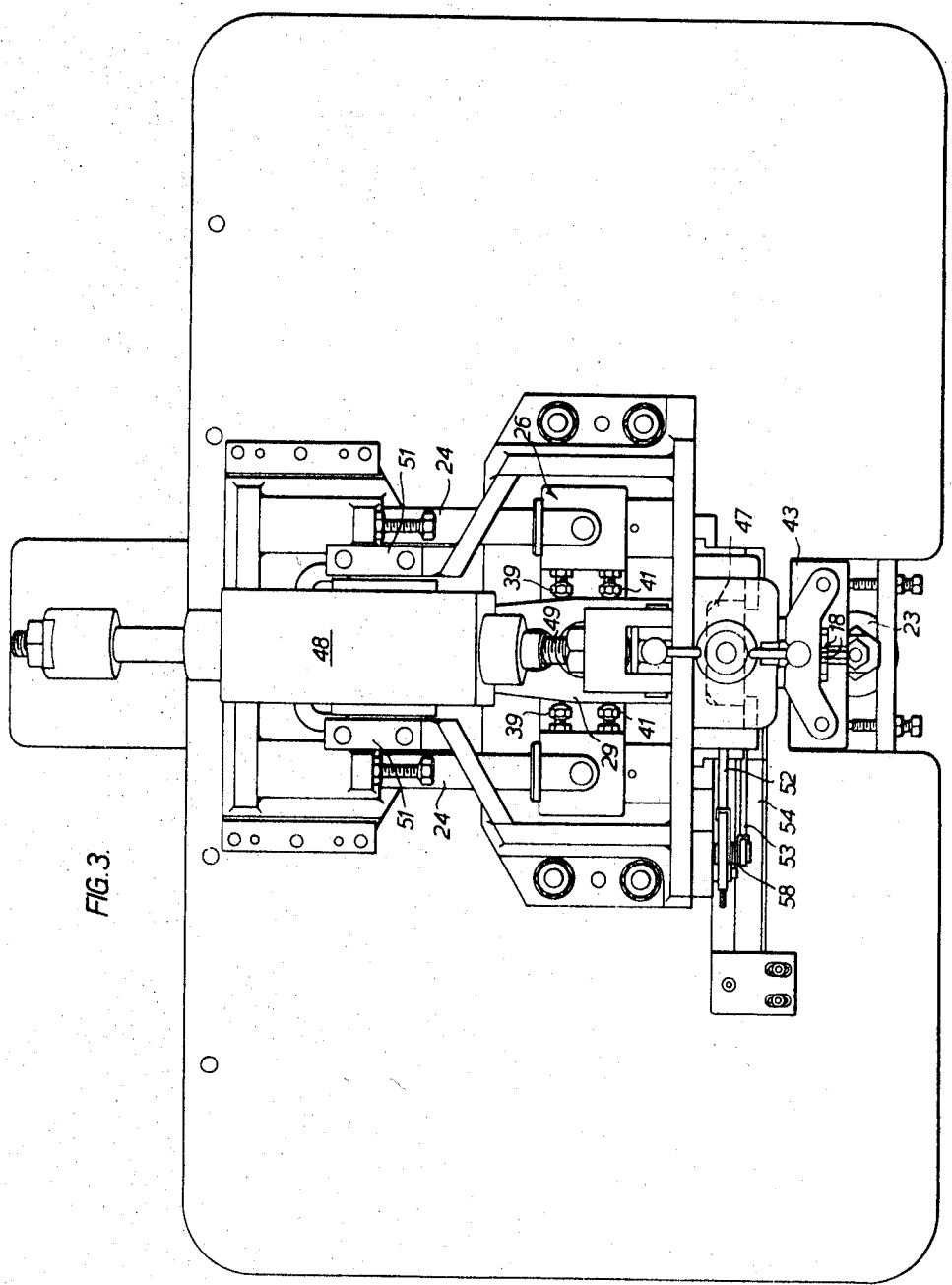
Figure 4:
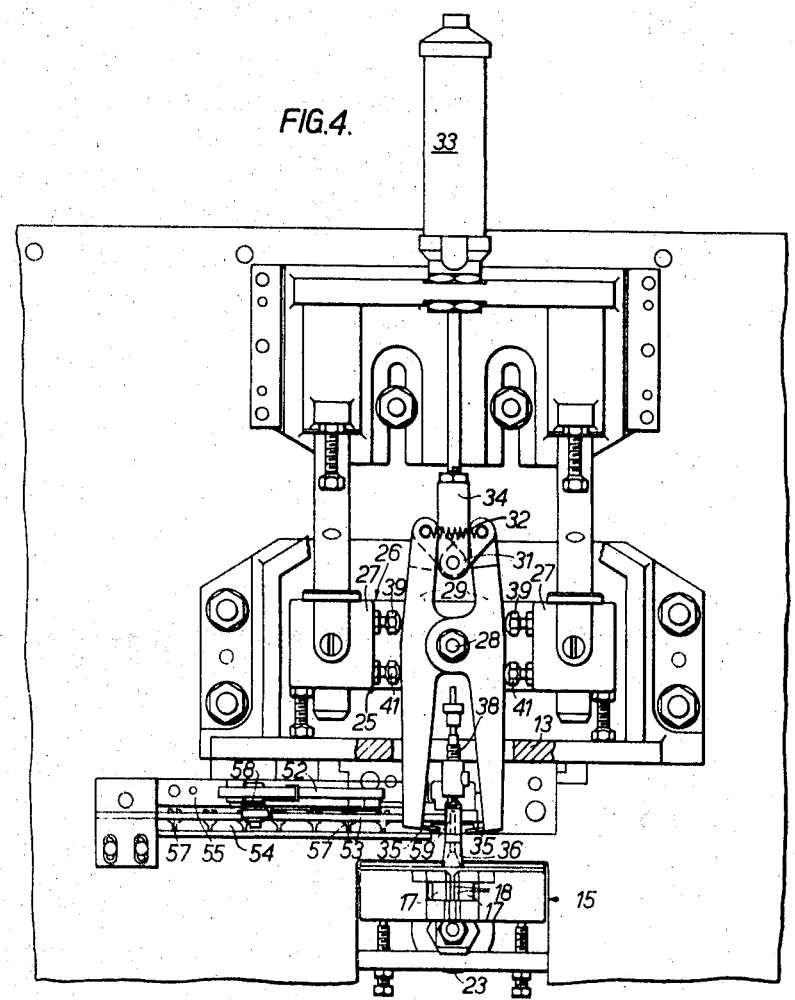
FIG. 4 is a view similar to FIG. 3 but with parts thereof omitted for clarity.

Referring to the drawings, the machine includes a fixed bed 11 having upstanding from the front edge of the upper surface 12 thereof, a vertical apertured wall 13. The front face 14 of the bed 11 has secured thereto a cable gripping mechanism 15.

The mechanism 15 is mounted on the bed 11 for movement in a vertical plane, and is urged to the upper limit of its travel by springs 16. The mechanism includes a pair of generally parallel arms 17 pivoted at their midpoints. Each arm is formed at its upper end with a jaw 18 and carries at its lower end a roller 19, a spring 21 being provided to urge the arms in a direction to move the jaws 18 apart. A movable cam 22 extends between the arms 17 and is engaged by the rollers 19, the cam 22 being movable in response to operation of a pneumatic cylinder 23 to move the rollers 19 apart and thereby move the jaws 18 towards one another.

The surface 12 of the bed 11 has secured thereto a pair of parallel guide rods 24 on which the cable stripping mechanism 25 is slidably supported. The stripping mechanism 25 is supported on the guide rods 24 for sliding movement in a horizontal plane towards and away from the gripping mechanism 15. The mechanism 25 includes a U-shaped carriage 26, the vertical limbs of which are bored to receive the rods 24. Pivotally engaged with the base of the carriage 26 by means of a bolt 28 are a pair of generally parallel arms 29, the arms being interconnected at their ends remote from the mechanism 15 by an overcenter toggle linkage 31. The linkage 31 includes a spring 32 urging said ends of the arms 29 towards one another. The center point of the linkage 31 is attached to the ram 34 of a pneumatic cylinder 33. The ends of the arms 29 adjacent the mechanism 15 carry a pair of cooperable cutters 35 which are brought together as the linkage 31 is moved over center. The front of the carriage 26 is extended towards the mechanism 15 and carries a tapering hollow cable guide 36 and a microswitch 37, the switch 37 having an operating push rod 38 positioned at the end of the guide 36 remote from the mechanism 15. Each of the limbs 27 of the carriage 26 carries a pair of stop means 39, 41 which extend towards the arms 29, the members 39 being positioned on the limbs 27 between the bolt 28 and the linkage 31, while the members 41 are positioned on the limbs 27 between the bolt 28 and the cutters 35.

Slidably mounted for vertical movement on the front face of the wall 13 is the slide 43 of the crimping mechanism 42. Secured to the upper surface 12 of the bed 11 below the slide 43 is an anvil 44 upon which in use a connector 57 rests, the connectors being integral with a continuous metal ribbon 55 which is fed into the machine in a manner to be described. The slide 43 carries a hammer 45 which, in use, cooperates with the anvil 44 to crimp a connector onto a lead. A toggle linkage 46 extends between the slide 43 and an adjustable stop 47 secured to the wall 13. The center pivot of the linkage 43 is connected to the ram 49 of a pneumatic cylinder 48, the cylinder 48 being mounted on trunnions 51 supported on the bed 11.

Pivotally engaged with the slide 43 is one limb of a bell crank lever 52, the other end of which has pivotally engaged therewith a finger 53. The free end of the finger 53 rides in a channel 54 along which the metal ribbon 55 extends from a supply reel 56. The metal ribbon 55 has integral therewith a plurality of connectors 57 spaced at equal intervals along its length. The finger 53 is urged by a spring 58 in a direction so that its free end engages the base of the channel 54, and the finger 53 is inclined at a small angle to the base of the channel 54. As the slide 43 reciprocates, the free end of the finger 53 moves backwards and forwards along the base of the channel 54 and on each forward movement the finger 53 engages a connector 57 on the ribbon 55, and so pushes the ribbon 55 along the channel towards the anvil 44. As the finger 53 moves back again, it rides over the adjacent connector 37 on the ribbon 55. In order to prevent the ribbon 55 being dragged back with the finger, there is provided a ramp on the base of the channel 54 over which the connectors ride when moving toward the anvil 44 and which is shaped to prevent the connectors moving back again. The ramp is spaced from the anvil 44 by a distance equal to the spacing of the connectors 57 on the ribbon 55, so that when connector 57 is engaged therewith, the adjacent connector remote from the supply reel 56 will be positioned on the anvil 44. During the return movement of the finger 53, it is moved back by a distance greater than the spacing of the connectors 57 so that when the finger 53 again moves forward, there will be sufficient delay to allow the hammer 45 to move upwardly clear of the anvil 44 before a subsequent connector 57 is moved onto the anvil 44.

The operation of the machine is as follows:

A cable 59 comprising an inner conductive core and an outer insulating sheath is inserted between the jaws 18 and through the guide 36 by an operator. The cable 59 is guided between the cutters 35 and engages the end of the push rod 38, and in so doing actuates the microswitch 37. The length of cable 59 which has passed between the cutters 35 is determined by the position of the push rod 38 with respect to the cutters 35, and the push rod 38 is adjustable to vary the length of cable from which the sheath will be stripped. Closing of the microswitch initiates operation of a cam control system which controls the operation of the machine. Initial movement of the cam causes operation of the pneumatic cylinder 23 so moving the cam 22 upwards to cause the arms 17 to pivot in a direction to move the jaws 18 towards each other to grip the cable 59.

When the cable 59 is gripped by the jaws 18 the cam control then causes operation of the cylinder 33 to draw the ram 34 in a direction away from the gripping mechanism 15. The carriage 26 is not however moved with the ram 34 initially owing to the inertia of the carriage 26 and to the friction between the limbs 27 and the guide rods 24. Thus, as the ram 34 is retracted the ends of the arms 29 adjacent the ram 34 are moved apart under the action of the linkage 31 and the arms 29 are pivoted about the bolt 28 to move the cutters 35 together. The stops 39 are so positioned that the pivotal movement of the arms 29 is arrested when the cutters 35 have cut through the insulating sheath of the cable 59, but before the conductive core of the cable 59 is severed. When the pivotal movement of the arms 29 is arrested, the linkage 31 becomes locked and the carriage with the cutters 35 in their closed position is drawn back with the ram 34 thereby stripping a predetermined length of the insulating sheath from the cable 59 and leaving the core thereof bare. When the carriage 26 is retracted the guide 36 and the microswitch 37 and push rod 38 are drawn back with it leaving the bared cable 59 positioned above the anvil 44 of the crimping mechanism 42. When the carriage reaches its rearmost position so that the cutters 35 and the guide 36 are clear of the path of movement of the slide 43, the cam control causes operation of the cylinder 48 so that the ram 49 thereof is urged outwardly. This movement of the ram 49 is transmitted through the linkage 46 to the slide 43 to cause downward movement of the slide 43.

As the slide 43 moves downwardly, the hammer 45 moves downwardly with it. The hammer 45 has an inverted V-shaped slot 61 therein, the base of which is so shaped as to crimp parts of the connector 57 when the connector 57 is trapped between the hammer 45 and the anvil 44. As the slide 43 descends the bared bore of the cable 59 engages in the slot 61 of the hammer 45. As the core of the cable 59 engages the slot 61, a pair of adjustable stops 62 on the slide 43 engage the gripping mechanism 15 so that on further downward movement of the slide 43, the gripping mechanism 15 and the cable 59 gripped therein are carried downwardly with the slide 43, against the action of the springs 16. As the hammer 45, moves downwardly, the bared core of the cable 59 moves with it and the hammer 45 guides the cable 59 downwardly between two pairs of upstanding tags on the connector 57 supported on the anvil 44. The final part of the movement of the hammer 45 downwardly relative to the anvil 44 crimps the two pairs of tags to grip the cable within the connector, the first pair of tags being crimped to grip the cable sheath and the second pair of tags being crimped to grip the cable core and thereby electrically interconnect the cable 59 and the connector 57.

As the hammer 45 crimps the connector 57 to the lead 59 a pair of coacting guillotine parts 63 sever the connector 57 from the ribbon 55 and also sever the part of the ribbon 55 to which the connector 57 was attached from the remainder of the ribbon 55. The scrap parts of the ribbon 55 drop down into a chute 64 and are collected in a container 66.

When the slide 43 reaches the bottom of its stroke, the cam control reverses the operation of the cylinder 45 to cause retraction of the ram 49. As the ram 49 retracts, the slide 43 is raised and the gripping mechanism 15 is raised to its original position by the springs 16 and is released to allow the operator to remove the cable 59 with the connector 57 crimped thereto. During the raising of the slide 43, the feed finger 53 is moved to feed a further connector 57 into a position on the anvil 44 in the manner previously described. When the slide reaches its upper position, the cam control apparatus operates the cylinder 33 to move the ram 34 outwardly. Initial movement of the ram pivots arms 29 in a direction to open the cutters 35 so that the length of insulating sheath can drop into a second chute 65 to be collected in a container 67. The arms 29 pivot until they engage the stops 41 whereupon the linkage 31 again becomes locked and the carriage 26 is moved forward in preparation for a further cycle. To ensure that there is sufficient resistance to movement of the carriage 26 to cause pivoting of the arms 29, the limbs 27 of the carriage and the guide rods 24 are provided with coacting friction means, which are adjustable to compensate for wear of the limbs 27 and rods 24, in use.

The machine is provided with an air jet which is positioned to blow compressed air onto the cutters 35 at the required time to aid removal of the length of cable sheath from the cutters.

The adjustable stop 47 of the crimping mechanism 42 is in the form of a micrometer adjustment and is movable to alter the position of the upper link of the toggle linkage 46 and thereby accurately adjust the limits of movement of the slide 43.

We claim:
1. A machine for securing and electrically connecting an electrical cable to an electrical connector including:
   a gripping mechanism for gripping a cable;
   means operable automatically when the cable is gripped by said gripping mechanism for stripping a length of the insulating sheath from the end of said cable, said means including;
   a carriage movable towards and away from said gripping mechanism;
   a pair of relatively movable coacting cutter members on the carriage;
   stop means acting between the carriage and the cutter members to limit said relative movement of the cutter members;
   actuating means acting through the cutter members for moving the carriage, the arrangement being such that in use initial operation of said actuating means causes relative movement of said cutter members to sever the insulating sheath of the cable whereupon said stop means arrests said relative movement of the cutter members so that further operation of said actuating means moves the carriage away from the gripping mechanism to strip the severed part of the insulating sheath from the cable; and
   further means operable automatically when the sheath has been stripped for crimping a connector to at least the bared core of the cable, while the cable is still held by said gripping mechanism.

2. A machine as claimed in claim 1 wherein said means for crimping the connector includes an anvil on which an electrical connector is supported in use, a hammer movable between upper and lower limit positions towards and away from the anvil for crimping the connector to the cable, actuating means acting through a toggle linkage to move the hammer, and adjusting means associated with one link of said toggle linkage for adjusting the limit positions between which the hammer is movable.

3. A machine for stripping an insulating sheath from an electrical cable including:
   a gripping mechanism for gripping the cable;
   a carriage movable towards and away from said gripping mechanism;
   a pair of arms;
   means pivotally mounting said arms intermediate their ends on the carriage;
   a pair of relatively movable, coacting cutter members defined at one end of said arms respectively;
   a toggle linkage interconnecting the ends of said arms remote from said cutter members;
   actuating means coupled to the center point of said toggle linkage; and
   stop means acting between the carriage and said arms, the arrangement being such that in use initial operation of said actuating means straightens said toggle linkage and thereby pivots said arms relative to the carriage in a manner to move said cutter members towards one another until said arms engage said stop means to prevent further pivotal movement of the arms, the inertia of the carriage and friction in mounting means for the carriage resisting movement of the carriage during said initial movement of the actuating means, said inertia and friction being overcome when said arms engage said stop means, so that said carriage is moved by further movement of said actuating means, said initial movement of said actuating means causing said cutter members to sever the insulating sheath of the cable, and said further movement of the actuating means causing said cutter members to strip the severed part of the insulating sheath of the cable from the cable.

4. A machine as claimed in claim 3 wherein said mounting means for the carriage includes friction means which is adjustable to vary the degree of friction and to take up wear in said mounting means in use.

5. A machine as claimed in claim 3 wherein said actuating means includes a fluid operable ram.

6. A machine as claimed in claim 3 wherein movement of the actuating means in the opposite direction after a stripping operation initially moves said members apart so that the stripped sheath of the cable is released, said movement of the cutter members being arrested by further stop means whereupon further movement of the actuating means moves the carriage, towards the gripping mechanism in preparation for a further stripping operation.

7. A machine as claimed in claim 3 wherein said stop means and said further stop means are carried by said carriage.

8. A machine for crimping an electrical connector to an electrical cable including:
a frame;
a gripping mechanism for gripping a cable;
an anvil on which an electrical connector is supported in use;
a hammer movable towards and away from the anvil, between an upper limit position and a lower limit position, for crimping the connector to the cable;
a stop on the frame of the machine;
means for adjusting the position of said stop in a direction towards or away from said anvil;
a toggle linkage interconnecting said hammer and said stop; and
actuating means, said actuating means being coupled to the center point of said toggle linkage, and acting through the toggle linkage to move the hammer relative to the anvil, said means for adjusting the position of said stop serving to permit adjustment of the upper and lower limit positions of the hammer.

9. A machine as claimed in claim 8 wherein said hammer is shaped to guide said cable into engagement with said connector during movement of said hammer to its lower limit position.

10. A machine as claimed in claim 8 including means for feeding electrical connectors onto said anvil during movement of said hammer to its upper limit position.

11. A machine as claimed in claim 10 wherein the electrical connectors are integral with, and spaced along a connecting strip and the machine includes means for severing a crimped connector from said strip after the crimping operation.